United States Patent [19]
van Rassel

[11] Patent Number: 4,817,142
[45] Date of Patent: Mar. 28, 1989

[54] RESTORING FRAMING IN A COMMUNICATIONS SYSTEM

[75] Inventor: William van Rassel, Willowdale, Canada

[73] Assignee: Scientific Atlanta, Inc., Atlanta, Ga.

[21] Appl. No.: 736,305

[22] Filed: May 21, 1985

[51] Int. Cl.$^4$ .............................................. H04K 1/00
[52] U.S. Cl. .......................................... 380/15; 380/48
[58] Field of Search ...................... 178/22.17; 375/108, 375/112, 116; 358/120; 380/15, 48

[56] References Cited

U.S. PATENT DOCUMENTS

| | | | |
|---|---|---|---|
| 3,447,085 | 5/1969 | De Haas et al. | |
| 3,530,232 | 9/1970 | Reiter et al. | 358/120 |
| 3,535,451 | 10/1970 | Webb . | |
| 3,652,799 | 3/1972 | Thomas | 375/111 |
| 3,757,044 | 9/1973 | Verhoeckx et al. | |
| 3,795,763 | 3/1974 | Golding et al. | |
| 4,002,845 | 1/1977 | Kaul et al. | |
| 4,005,265 | 1/1977 | Verhoeckx et al. | |
| 4,172,963 | 10/1979 | Belcher et al. | 178/22.17 |
| 4,295,155 | 10/1981 | Jarger et al. | |
| 4,316,284 | 2/1982 | Howson | 375/108 |
| 4,319,273 | 3/1982 | Nossem | 358/120 |
| 4,333,107 | 6/1982 | McGuire et al. | 358/120 |
| 4,383,322 | 5/1983 | Halpern et al. | 375/112 |
| 4,424,532 | 1/1984 | den Toonder et al. | |
| 4,466,017 | 8/1984 | Banker | 358/120 |
| 4,471,380 | 9/1984 | Mobley | 358/120 |
| 4,523,228 | 6/1985 | Banker | 358/120 |
| 4,594,609 | 6/1986 | Romao et al. | 358/119 |
| 4,618,888 | 10/1986 | Nohara et al. | 380/15 |
| 4,694,491 | 9/1987 | Horne et al. | 380/15 |

FOREIGN PATENT DOCUMENTS 2112933 6/1972 France .

Primary Examiner—Salvatore Cangialosi
Attorney, Agent, or Firm—Banner, Birch, McKie & Beckett

[57] ABSTRACT

A secure communications system requires special arrangements for the establishment and maintenance of framing and synchronization. A framing word is transmitted at a fixed frequency, and a key necessary to unscramble the transmission is transmitted in a fixed position in relation to the framing word. Synchronization information (reference clock bursts) is scrambled with the intelligence and may only be recovered once the key is available. When framing is being maintained, the receiver's phase-locked loop opens only during the short reference clock bursts in the incoming signal, and the framing signal generator is able to predict the occurrence of successive framing signals without reference to the incoming signal. When framing is lost, the receiver enters a "soft lock" condition in which its phase-locked loop is opened to receive the entire incoming signal and in which the framing signal generator refers solely to the incoming signal to generate framing signals.

20 Claims, 5 Drawing Sheets

RESTORING FRAMING IN A COMMUNICATIONS SYSTEM

TECHNICAL FIELD

This invention is concerned with achieving and maintaining proper framing and synchronization in a communications system, especially in a secure communications system. Proper framing exists when slots in the received time sequence are correctly associated with the appropriate positions in the transmitted time sequence; proper synchronization implies that the transmitter and receiver clocks are locked to each other (so that bit integrity is maintained).

BACKGROUND OF THE INVENTION

Various types of communications systems are of such a character that proper framing is necessary to their operation. For example, in time-division multiplex transmission of independent digital bit streams, correct interpretation of the value of the incoming signal as one member of the transmitted symbol set, and direction of the interpreted symbol to the correct receiver, require proper framing. Likewise, in television transmission, picture elements displayed at the receiver must be in the same relative positions as those appearing at the transmitter, and, for a line-and-field scanned television signal (one in which the picture being transmitted is scanned in fields of adjacent parallel lines), proper framing is necessary to achieve this. Unless the data frames are especially short (for example, individual ASCII characters), correct synchronization is needed to maintain reliable communication during the periods between successive framing signals.

In ordinary (non-secure) communications systems, framing information often takes the form of a unique word, identification of which by the receiver establishes a particular instant as the datum from which time measurements may be made. The same word occurs periodically, at the same time in relation to each frame of data (for example, a television frame or field). Since the framing word occurs at a constant frequency and is identical for each frame, framing of the received intelligence is easily accomplished.

This technique is unsuitable, however, for a secure communications system, since an important security feature may be the denial of framing information. Framing denial can be accomplished by varying the time at which the intelligence occurs in relation to the framing word (scrambling); but some means must then be found of delivering this framing information to the intended recipient. If the addressee possesses the key to unscramble the data, no problem should occur. However, a further difficulty arises when sychronization information (such as a reference clock burst) is scrambled along with the intelligence. Such information is necessary to the framing process because it keeps the clock from drifting too far during the relatively long periods between framing pulses.

SUMMARY OF THE INVENTION

It is an object of the present invention to achieve and maintain proper framing in a communications system.

It is a further object of the invention to achieve and maintain proper framing in a secure communications system.

Another object of the invention is to recover framing and synchronization information from a scrambled intelligence signal.

Another object of the invention is to recover such information from an intelligence signal which is scrambled in accordance with a key contained within the scrambled intelligence signal.

The communications system embodying the present invention is one transmitting broadcast television. In order to deny programming to unauthorized receivers (e.g., those who have not paid for the service), the broadcaster scrambles the lines of the television picture, i.e., varies their time of occurrence relative to each other or to a regularly occurring datum, such as a timing signal produced at the transmitter. Scrambling is done in accordance with a key, and the key is transmitted along with the scrambled picture. The synchronization pulses which would ordinarily be transmitted in the blanking intervals are omitted (for security), and these intervals are used to transmit the key, the audio for the program, and the timing signal (encoded as a unique word). For further security, the key is encrypted (using a master key previously placed in the possession of the recipient). Although the signal is scrambled, the transmitted key is transmitted with a constant time relationship to the timing signal; this enables the transmitted (encrypted) key to be recovered once the timing signal is recovered.

The receiver for such a signal includes a number of components. One, a framing signal generator, generates a framing signal based on the received timing signal or on previously received timing signals (extrapolated locally using the receiver's clock). When the generated framing signal is locally generated, based on extrapolation from previously received timing signals, it is in substantial coincidence with the transmitted timing signal (except, of course, when framing is lost). When the received timing signal is output as the framing signal, no extrapolation is necessary.

Another component is the key detector, which looks for the transmitted key at a predetermined time before or after the framing signal. The key detector also includes decryption circuitry for decrypting the detected key in accordance with the prearranged master key.

A third component is a gating signal generator and time base descrambler. This receives the framing signal and the decrypted key and calculates from the key the appropriate delay to place each line of the received picture in the proper time relationship to the others (to descramble the picture). This component also generates a gating signal for use by, among other components, the receiver's phase-locked loop (clock). The gating signal opens the loop at the appropriate time to admit a small portion of the received signal, ordinarily a reference clock burst occurring during each horizontal blanking interval.

An important component is the framing loss detector, which determines when proper framing is lost and which then causes certain changes in the operation of the other receiver components. The framing loss detector receives the same gating signal received by the phase-locked loop and examines the same portion of the received signal, the reference clock burst (although any other appropriate portion of the received signal could instead be examined). The framing loss detector then determines, from the examined portion of the received signal, whether framing is proper. If it is, no changes are made in the receiver's operation. If it is not, two things happen. First, the phase-locked loop is opened to the entire received signal, so the receiver's clock may be corrected, if necessary. (It is possible that framing was lost due to drift of the clock). Second, the framing signal generator is directed to generate framing signals based only on the received timing signals and not on historical information (i.e., prior timing signals extrapolated using the receiver's clock), which may no longer be valid.

With the phase-locked loop open, the receiver's clock will be corrected (because clock information is transmitted with the television signal). And with the framing signal generator looking only at the received timing signals and not at its own local extrapolation of them, receiver framing will by brought into agreement with the transmitted signal.

DETAILED DESCRIPTION OF THE PREFERRED EMBODIMENT

Figure 1:
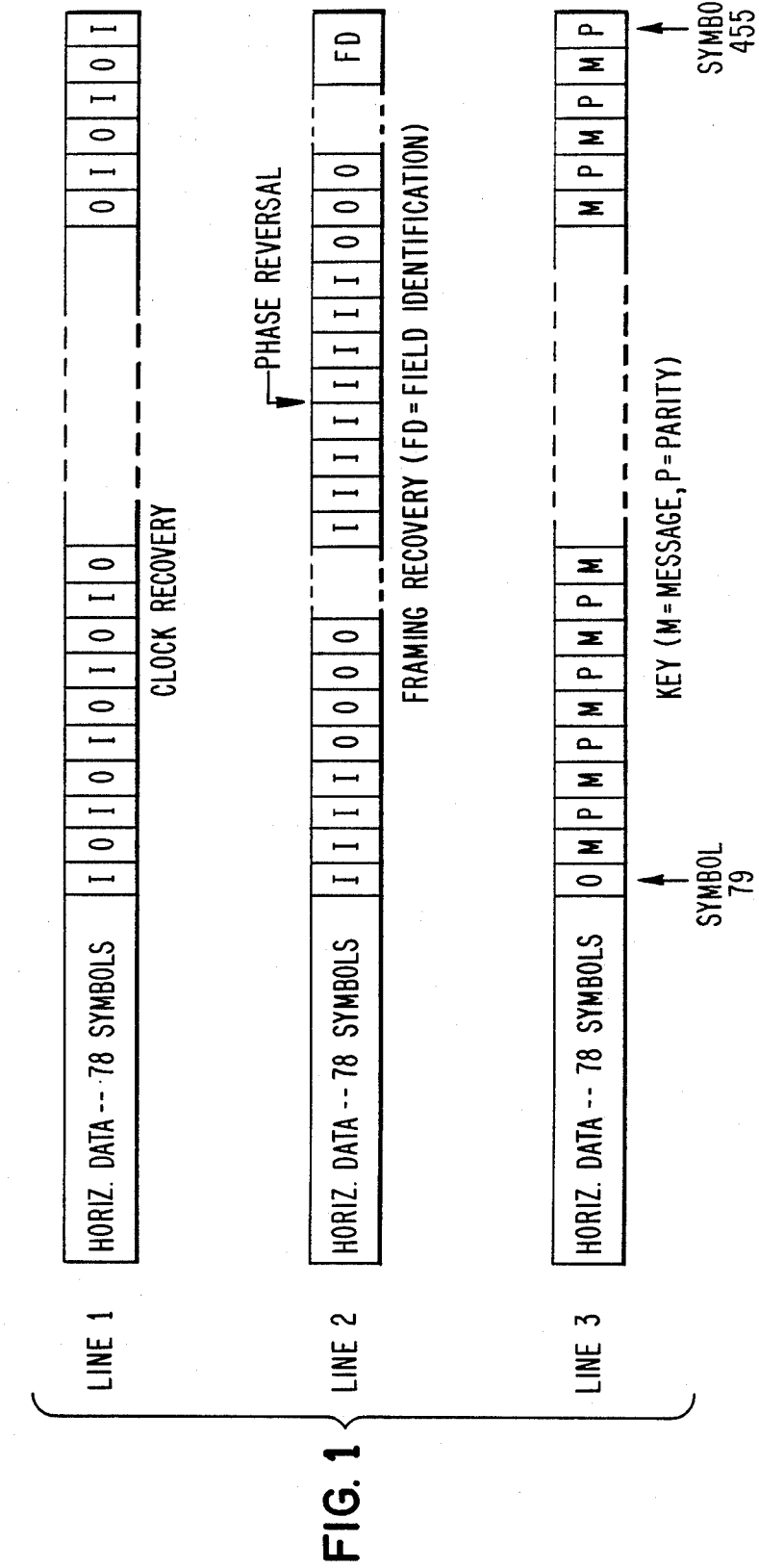
FIG. 1 illustrates three lines of a television transmission which may be recieved in accordance with this invention.

FIG. 1 illustrates three lines of a television transmission which may be received in accordance with this invention. The lines illustrated are lines 1–3 of the vertical blanking interval (VBI).

Each line shown contains certain information — here referred to as "horizontal data" — in its horizontal blanking interval (HBI), the first 10.9 us for an NTSC signal. Preferably the horizontal data includes program audio in digital form and a short burst — 10 cycles — at the reference clock frequency. The clock burst occurs at a fixed point during the HBI of lines within the VBI. The synchronization and blanking levels which would normally fill the HBI are removed.

During the video field, that is, between VBI's, the HBI's contain the same horizontal data but differ in an important respect from those illustrated. During the video field the length of each HBI, and the position of the reference burst within it, are varied by a pseudorandom amount from the standard. This is accomplished by adding or removing digital audio samples at appropriate places in the line. To avoid long-term shortages or surpluses of transmitted information, which could mount quickly, the pseudorandom variation is prearranged to average out to zero over each complete field.

Also during the video field, the active portion of each line (the portion not occupied by horizontal data) contains the separate analogue components (luminance and chroma) of the transmitted television line.

In the VBI, of course, there is no picture to be transmitted; and framing information may advantageously be transmitted during the active portion of each of the VBI lines. These lines (63.56 us long in NTSC) are occupied by a number of digital symbols (455, in NTSC) representing various items of information necessary to achieve and maintain proper framing. Simple division will show that, for a television transmission with the above parameters (one intended for an NTSC receiver), symbols occur at a rate of 7.16 MHz, twice the color subcarrier frequency.

Line 1 of the VBI, in its active portion, consists of alternating zeroes and ones, or maxima and minima of the transmitted symbol set (if multilevel symbols are used). Because of the rate of symbol transmission, line 1 therefore contains a 52.66 us continous wave at 3.58 MHz, the color subcarrier frequency and, preferably, one frequency available from the receiver's clock. (When the term "receiver" is used, it includes not only the NTSC, PAL, SECAM or other standard television receiver but also, more broadly, the decoder and other terminal equipment necessary to convert an incoming television signal to one of the standard formats, such as NTSC. The clock, therefore, is preferably part of the decoder portion of the receiver.) Line 1 may be gated into the receiver's phase-locked loop to drive it into synchronism with the transmitter's clock.

Line 2 of the VBI, in its active portion, consists of the timing signal encoded as a word, along with other information (the FD section of the line) needed to identify the particular field in which the line is occurring. Beginning with symbol 79, a series of first code patterns P is transmitted. The first code pattern P in the preferred embodiment is the following set of eight binary digits: 11110000. This first code pattern P is transmitted $41\frac{1}{2}$ times, for a total of 332 symbols. After the first code pattern P has been transmitted $41\frac{1}{2}$ times, the second code pattern Q is transmitted twice, in phase with P. Second code pattern Q, in the preferred embodiment, is the complement of first code patter P, that is, 00001111. Since an extra half cycle of P was transmitted, the "in phase" requirement means that transmissions of Q begin in the middle of the second code pattern Q (i.e., 1111). (If an integral number of patterns P had been transmitted, Q transmissions would begin at the beginning of Q — i.e., 0000.) The timing pulse is therefore encoded as the phase reversal occurring between the last transmission of first code pattern P and the first transmission of the second code pattern Q. After the second transmission of second code pattern Q, a field identification waveform is transmitted. This waveform serves to identify which of 16 fields is being transmitted. (It may be used to synchronize encryption elements of the system.)

Line 3, in its active portion, contains the (heavily error-corrected and preferably encrypted) key necessary to unscramble the pseudorandom variations in the position of the ten-cycle reference clock burst occurring during the HBI of each line of the video field. The key, which is updated once a frame, is used as the starting vector for a pseudorandom number generator circuit.

Figure 2:
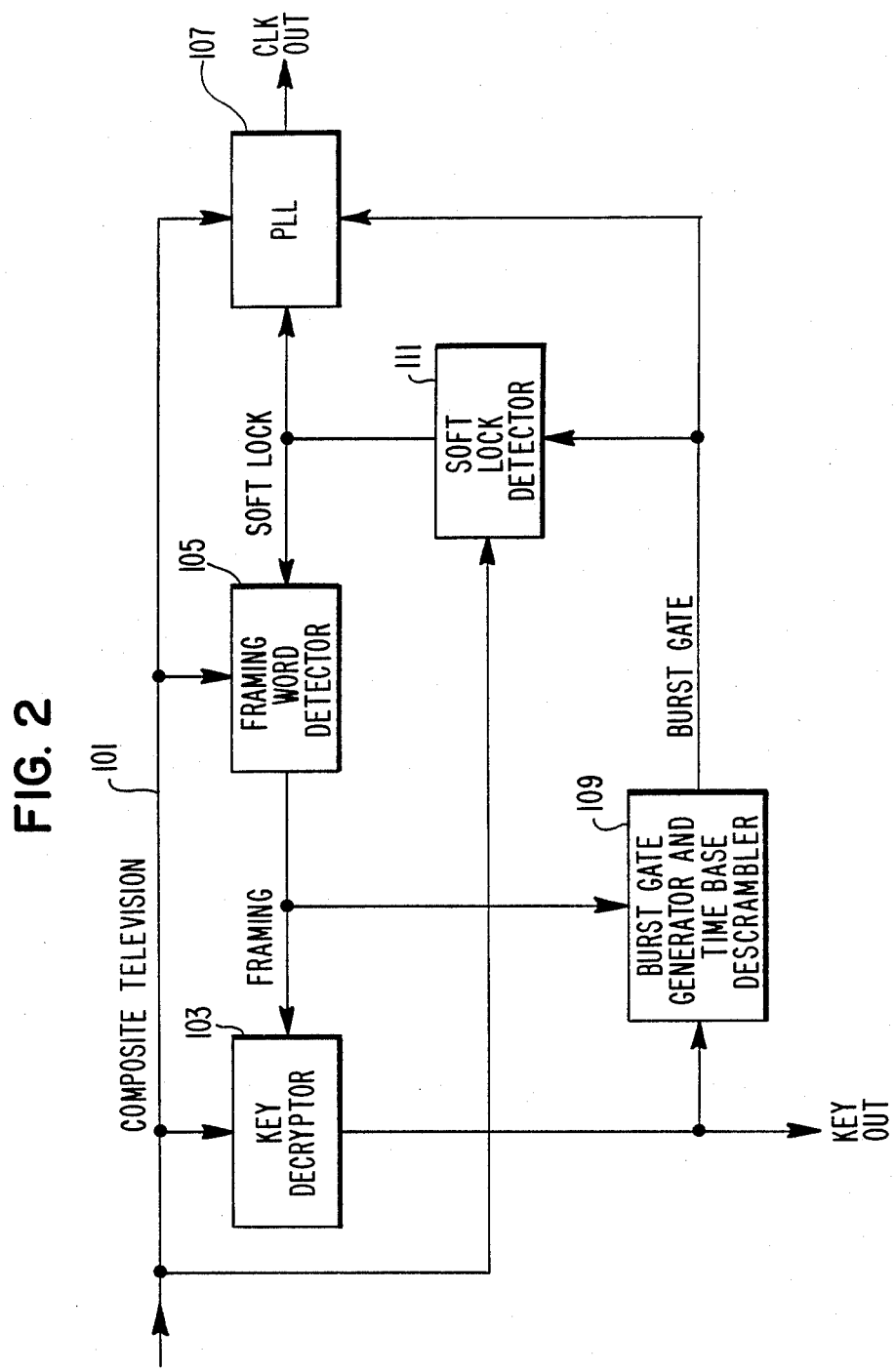
FIG. 2 is a diagram of the framing and synchronization components of a television receiver employing the present invention.

FIG. 2 is a diagram of the framing and synchronization components of the receiver (or, as mentioned above, the decoder). The scrambled television signal, scrambled in accordance with the key transmitted in line 3 of the VBI, arrives on line 101 and is delivered to key decryptor 103, framing word detector 105, and phase-locked loop 107. Detector 105 always receives the entire composite television signal so that it may always detect the transmitted timing signal, although it will usually output a locally-generated framing signal instead of using the received timing signal as the framing signal. Phase-locked loop 107 receives the composite television signal during periods determined by burst gate generator 109 (as modified by soft lock detector 111). When framing and synchronization are correct (hard lock condition), these periods are the periods of the ten-cycle reference burst in the HBI of every line. Key decryptor 103 receives the entire composite television signal so that it may detect the unscrambling key on line 3 of the VBI by computing the amount of time which elapses after framing word detector 105 outputs the framing signal. The clock signal output from phase-locked loop 107 is delivered as necessary to the receiver components.

Burst gate generator 109 requires both the framing signal (from detector 105) and the decrypted key (from decryptor 103) in order to determine the time of occurrence of the reference clock bursts in the HBI's of the composite television signal. Phase-locked loop 107 is ordinarily opened only during these periods for clock correction. Also during these burst periods, soft lock detector 111 is permitted to receive the composite television signal in order to determine whether the hard lock condition is being maintained. This is accomplished by integrating the received signal. Since the clock burst is a series of alternating 0 and 1 symbols, after removal of the DC component its average value should be zero. If, upon integration by soft lock detector 111, the portion of the composite television signal received during the period of the gating signal produced by generator 109 has a value of zero, framing is proper. If not, framing is improper; and soft lock detector causes the receiver to enter the "soft lock" condition by outputting a soft lock signal to both framing word detector 105 and phase-locked loop 107. The soft lock signal opens loop 107 to receive the entire composite television signal, including the clock signal in line 1 of the VBI. It also modifies the hysterisis algorithm of detector 105 so that locally-generated framing signals are ignored, and the framing signal output from detector 105 is the received timing signal.

Figure 3:
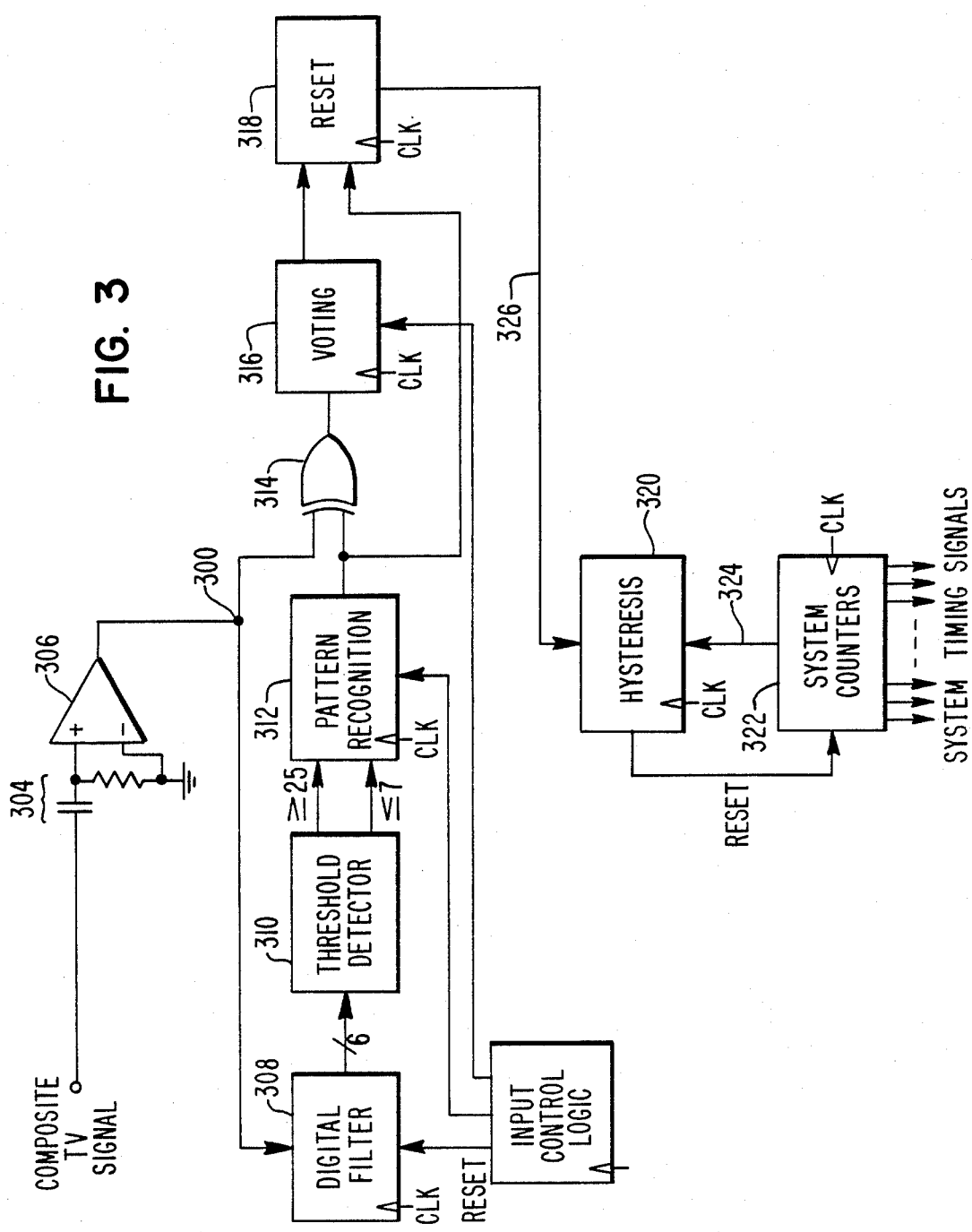
FIG. 3 is a diagram of the framing word detector shown in FIG. 2.

FIG. 3 is a diagram of framing word detector 105. The composite television signal (including the encoded timing pulse), although originating as a digital signal, is transmitted by radio in analog form. It is first filtered and amplified by, respectively, high pass filter 304 and amplifier 306. The resulting signal is next applied to input terminal 300.

Digital filter 308, an 8th-order digital bandpass filter tuned to 895 kHz, is a recursive filter. (The filter frequency, 895 kHz, is the frequency at which the code patterns P and Q occur (symbol frequency 7.16 MHz divided by eight symbols per code pattern.) The poles of filter 308 lie exactly on the unit circle in the z-plane, resulting in an extremely narrow bandwidth and, hence, excellent noise rejection. Stability of the filter is maintained by periodically clearing its storage elements by means of input control logic circuit 309.

When the 895 kHz code patterns enter digital filter 308, its output tends to increase. After the first code pattern P has been applied to digital filter 308 for a period of time between 28 us and 46 us (depending on the level of noise) the output of the filter will have risen to a high enough level to trigger threshold detector 310 and activate pattern recognition circuit 312. As shown in FIG. 3, the threshold for detecting a "1" at the output of digital filter 308 is a value greater than or equal to 25 "1"s. The threshold value for detecting a "0" at the output of digital filter 308 is a value less than or equal to 7. In 28 us, digital filter 308 will have received 25 first code patterns P; therefore, in the absence of noise, the accumulated value for each of the four "1" positions of first code pattern P will have reached 25. In 46 us, all 41½ repetitions of the first code pattern P will have been received.

Pattern recognition circuit 312 performs two functions. First, it examines the outputs of threshold detector 310 to determine if they were produced as the result of the application of an 895 kHz signal at the input of the digital filter. This is simply a matter of determining whether eight samples of the "greater than"/"less than" signal (out of threshold detector 310) satisfy the following two criteria:

a. There must be exactly four "greater than" and four "less than"; and b. There must be either four "greater than" in a row or four "less than" in a row.

Once it has determined that the 895 kHz signal was present, pattern recognition circuit 312 begins locally generating its own version of the 895 kHz signal, that is, a series of first code patterns P. These patterns are input to exclusive-OR gate 314 along with the incoming signal from input terminal 300 in order to locate the phase reversal (see FIG. 1) in the encoded synchronization signal.

When the phase reversal occurs, the output of exclusive-OR gate 314 will change from "0" to "1". The output of exclusive-OR gate 314 drives serial 12-of-16 voting circuit 316, whose output is active high whenever 12 of the last 16 input samples were "1"s. In the absence of noise, the point at which the voting circuit's output becomes active high is fixed with respect to the composite television signal (if the original synchronization signal itself is fixed, as it is in the preferred embodiment). However, due to noise which introduces errors in the phase reversed section of the encoded timing word, the point at which the voting circuit's output becomes active high will not necessarily be fixed.

This situation is remedied by re-synchronizing the output of voting circuit 316 with the locally generated first code pattern P from pattern recognition circuit 312. This re-synchronization takes place in reset circuit 318. (Without reset circuit 318, the output of voting circuit 316 would be taken as the decoded timing signal. In the preferred embodiment, however, the decoded timing signal is taken from the output of reset circuit 318.) Reset circuit 318 combines two items of information necessary accurately to recover the timing signal. From pattern recognition circuit 312, it receives the locally-generated stream of first code patterns P. Because these patterns are error-free, they include error-free information on the exact point during each code pattern when the timing signal could occur (mid-pattern). The only information missing is some indentification of which code pattern will have the timing signal at its center, and this is provided by voting circuit 316. Pattern recognition circuit 312 therefore provides a one-bit-wide window, during each cycle of first code pattern P, during which the timing signal may occur, given the correct state of voting circuit 316. The timing signal is output by reset circuit 318 in the one window which occurs during a code pattern when the voting circuit's output goes high.

The system described will regenerate accurately-timed timing signals under poor signal conditions. Under even worse signal conditions, the range of operation of the system may be extended by introducing a regenerative circuit for replacing timing signals which have been missed incorrectly decoded due to excessive noise. (This extension may be achieved only if the transmitted timing signals are periodic.)

In the preferred embodiment, the decoded timing signal from reset circuit 318 is used indirectly to reset system counters as shown in FIG. 3. System counters 322 operate continuously and automatically reset to 0 periodically, the period being nominally the same as the period of the transmitted timing signals. When the system counters are reset to 0, they develop a locally-generated framing signal on line 324 which is compared with the decoded timing signal on line 326. Comparison takes place in hysteresis circuit 320, which counts the number of occasions when the local framing signal and the decoded timing signal do not coincide. When the count reaches a predetermined value (5 in the preferred embodiment), the next decoded timing signal is used to reset the system counters. If the count is below the predetermined value, the decoded timing signal is not used to reset the system counters; they are allowed to reset automatically. This arrangement causes undetected timing signals to be regenerated by the system counters and causes timing signals which are occasionally incorrectly detected (i.e., detected when no timing word was transmitted) to be ignored.

The key decryptor may use any aglorithm similar in structure to that disclosed in the Data Encryption Standard (FIPS Publication 46) of the National Bureau of Standards, which publication is hereby incorporated into this application by reference. The algorithm disclosed in the DES, however, is preferable from a security standpoint. Once the framing signal is received from detector 105, decryptor 103 calculates the time of occurrence of the active portion of line 3 of the VBI. It then looks at the information appearing in the incoming signal during the calculated time period and treats this information as the encrypted key, decrypting it in accordance with the DES (and the master key previously introduced into the receiver). If framing is proper, this information really will be the key, and the television signal will be able to be unscrambled. If framing has been lost, the portion of the transmitted signal treated as the key will not provide the information needed to properly unscramble the picture.

Figure 4:
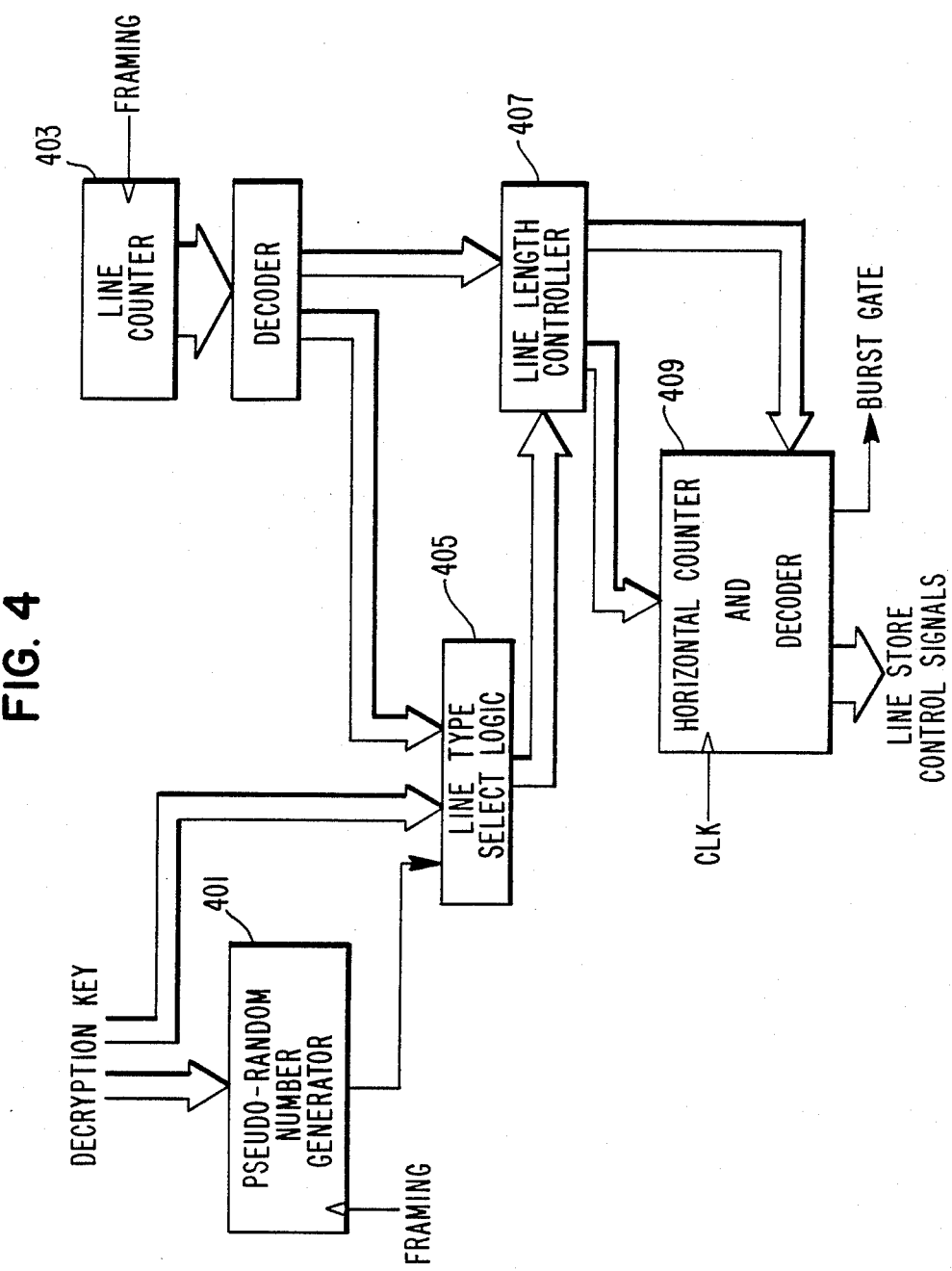
FIG. 4 is a diagram illustrating the operation of the burst gate generator and time base descrambler of FIG. 2.

FIG. 4 is a diagram showing the operation of burst gate generator and time base descrambler 109. The unscrambling key from decryptor 103 is used as the starting vector for pseudorandom number generator circuit 401. Circuit 401 produces (for the NTSC case) a sequence of 525 random numbers based on the key. These random numbers are then combined, with information derived from line counter 403 which is incremented once each line, in line-type selection circuit 405. This circuit selects which type of line (e.g., shortened by a standard amount, shortened by twice the standard amount, lengthened by either amount, or unchanged) is to appear next, and the information is fed to line length controller 407 which monitors the aggregate deviation in line lengths referenced to the start of the current field and ensures that the following two conditions are met:

(1) The aggregate deviation does not exceed ±9us at any time; and (2) The aggregate deviation at the end of the field must be zero.

The line length controller then provides information to horizontal counter and decoder 409, enabling counter/decoder 409 to produce the correct line store control signals for the current line and to calculate the location in each HBI of the reference clock burst and output the burst gates at the appropriate times.

Figure 5:
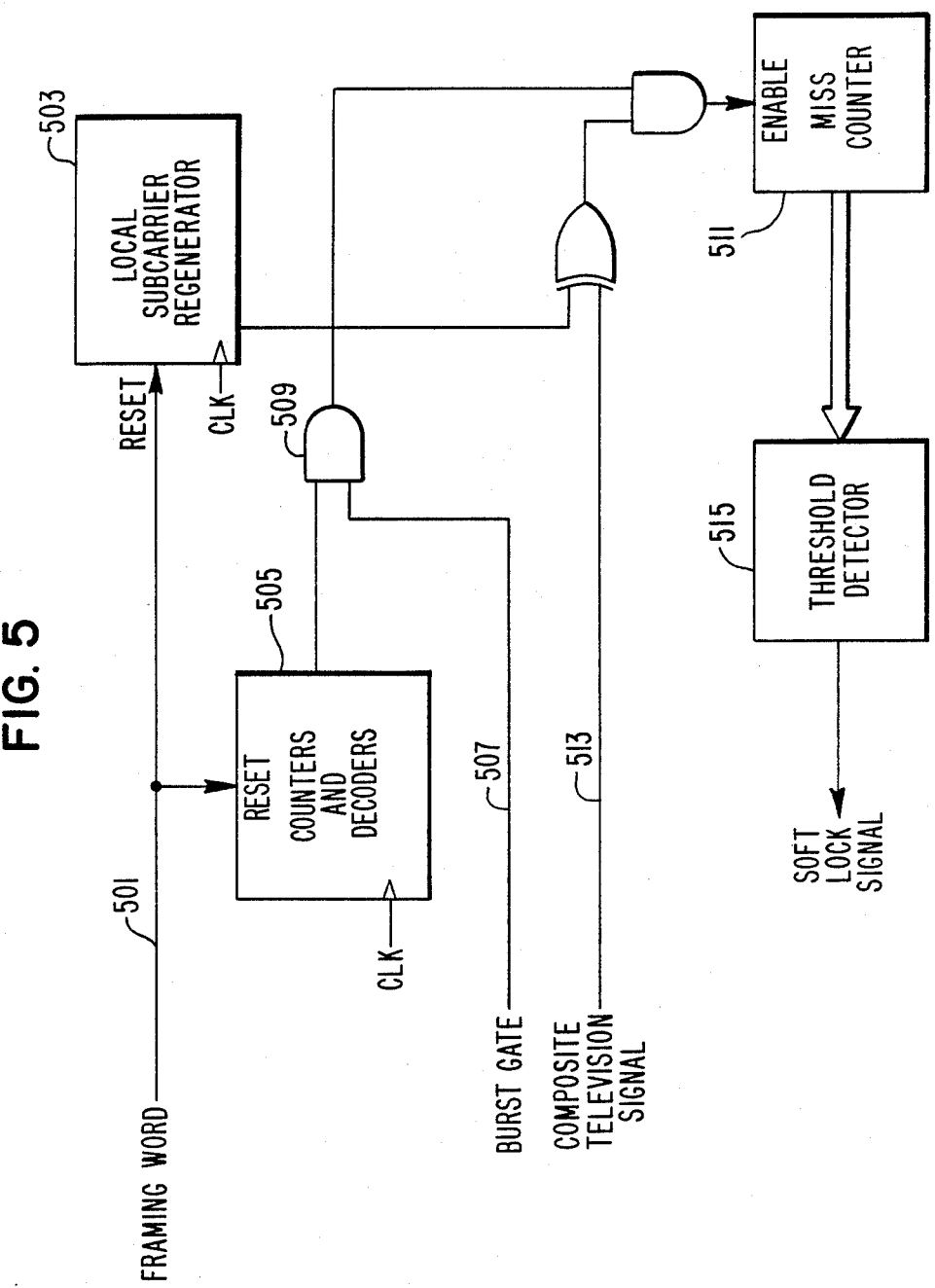
FIG. 5 is a diagram of the soft lock detector shown in FIG. 2.

FIG. 5 is a block diagram showing details of soft lock detector 111. The framing pulse from framing word detector 105 arrives on line 501 and is used to reset both local subcarrier regenerator 503 and the counters in counter/decoder circuit 505. Circuit 505 produces an output which is active during lines 22 through 42 of every field. This output is gated with the burst gate signal arriving on line 507, in AND gate 509, to produce a pulse which is active only during the burst on field lines 22 through 42. This signal is then used to enable miss counter 511 whenever the locally generated subcarrier (from generator 503) does not match the composite television signal (arriving on line 513). When the output from miss counter 511 exceeds a preset threshold, the output of threshold detector 515 becomes active, sending the soft lock signal to framing word detector 105 and phase-locked loop 107.

Although illustrative embodiments of the present invention have been described in detail with reference to the accompanying drawings, it is to be understood that the invention is not limited to those precise embodiments, and that various changes and modifications may be effected therein by one skilled in the art without departing from the scope or spirit of the invention.

I claim:

1. In a receiver for receiving an intelligence signal which includes a timing signal and a transmitted key bearing a predetermined time relationship to the timing signal, the intelligence signal being scrambled in accordance with the transmitted key and being of such a character that proper framing is necessary for reception, an apparatus for detecting a loss of, and restoring, proper framing, said apparatus comprising:

framing signal generating means receiving the scrambled intelligence signal and responsive to a framing loss signal for outputting as the framing signal the received timing signal and responsive to the absence of the framing loss signal for outputting as the framing signal a locally generated framing signal, the locally generated framing signal being in substantial coincidence with the timing signal except when framing is improper;

key detection means receiving the scrambled intelligence signal and the framing signal for outputting as a detected key a signal derived from that portion of the scrambled intelligence signal which bears the predetermined time relationship to the framing signal; and framing loss detection means receiving the scrambled intelligence signal during a predetermined period dependent upon the detected key for detecting improper framing and for generating the framing loss signal until proper framing is restored, said predetermined period corresponding to a predetermined portion of a horizontal blanking interval when framing is proper.

2. The apparatus of claim 1 further comprising gating signal generating means receiving the framing signal and the detected key for generating a gating signal during the predetermined period, said framing loss detection means receiving the gating signal.

3. The apparatus of claim 1 further comprising clock generator means for generating a clock signal in phase with an input signal, said clock generator means being responsive to the framing loss signal to receive as the input signal the entire scrambled intelligence signal and being responsive to the absence of the framing loss signal to receive as the input signal the scrambled intelligence signal only during the predetermined period, said clock signal being received by said framing signal generating means, said key detection means and said framing loss detection means.

4. The apparatus of claim 1 wherein the transmitted key is encrypted, said key detection means including decryption means for decrypting that portion of the scrambled intelligence signal which bears the predetermined time relationship to the framing signal.

5. The apparatus of claim 1 wherein said framing signal generating means comprises a hysteresis circuit to output the received timing signal as the framing signal in response to the framing loss signal only when a predetermined number of consecutive locally generated framing signals are not in substantial coincidence with timing signals.

6. In a receiver for receiving an intelligence signal which includes a timing signal and a transmitted key bearing a predetermined time relationship to the timing signal, the intelligence signal being scrambled in accordance with the transmitted key and being of such a character that proper framing is necessary for reception, a method of detecting the loss of, and restoring, proper framing, said method comprising the steps of:
receiving the scrambled intelligence signal,
determining whether framing is proper by examining a predetermined section of the scrambled intelligence signal, said predetermined section corresponding to a predetermined portion of a horizontal blanking interval when framing is proper;
identifying the predetermined section by reference to a detected key;
deriving the detected key from the portion of the scrambled intelligence signal which bears the predetermined time relationship to a selected framing signal; and
selecting the framing signal based on the determination of whether framing is proper, such that
i. if framing is proper, the selected framing signal is a locally generated framing signal in substantial coincidence with the received timing signal; and
ii. otherwise, the received timing signal is the selected framing signal.

7. In a receiver for receiving an intelligence signal which includes a timing signal and a transmitted key bearing a predetermined time relationship to the timing signal, the intelligence signal being scrambled in accordance with the transmitted key and being of such a character that proper framing is necessary for reception, a method of detecting the loss of, and restoring, proper framing, said method comprising the steps of:
receiving the scrambled intelligence signal;
generating a clock signal at a frequency determined by a selected reference signal;
determining whether framing is proper by examining a predetermined section of the scrambled intelligence signal, said predetermined section corresponding to a predetermined portion of a horizontal blanking interval when framing is proper;
identifying the predetermined section by reference to a detected key;
deriving the detected key from the portion of the scrambled intelligence signal which bears the predetermined time relationship to a selected framing signal;
selecting the framing signal based on the determination of whether framing is proper, such that
i. if framing is proper, the selected framing signal is a locally generated framing signal in substantial coincidence with the received timing signal; and
ii. otherwise, the received timing signal is the selected framing signal; and
selecting the reference signal based on the determination of whether framing is proper, such that
i. if framing is proper, the selected reference signal is the scrambled intelligence signal only during the predetermined period; and
ii. otherwise, the selected reference signal is the entire scrambled intelligence signal.

8. The method of claim 6 wherein the transmitted key is encrypted and said step of deriving the detected key comprises decrypting that portion of the scrambled intelligence signal which bears the predetermined time relationship to the selected framing signal.

9. The apparatus of claim 1 wherein said predetermined portion comprises clock burst information.

10. The apparatus of claim 9 wherein said framing loss detection means integrates said scrambled intelligence signal received during said predetermined period and generates said framing loss signal in response to the results of said integration.

11. The method of claim 6, wherein said predetermined portion comprises clock burst information.

12. The method of claim 11, wherein said step of determining comprises integrating said predetermined section of the scrambled intelligence signal.

13. The method of claim 7, wherein said predetermined portion comprises clock burst information.

14. The method of claim 13, wherein said step of determining comprises integrating said predetermined section of the scrambled intelligence signal.

15. In a receiver for receiving an intelligence signal which includes a timing signal and a transmitted key, the intelligence signal being scrambled in accordance with the transmitted key and being of such a character that proper framing is necessary for reception, a method of detecting the loss of proper framing, said method comprising the steps of:
receiving the scrambled intelligence signal;
identifying a predetermined section of the scrambled intelligence signal by reference to the transmitted key;
determining whether said predetermined section contains a predetermined portion of a horizontal blanking interval; and
generating a framing loss signal if said predetermined section is found not to contain said predetermined portion.

16. The method of claim 15 further comprising the step of selecting a framing signal such that
i. a received timing signal is said framing signal if a framing loss signal is generated; and
ii. otherwise, a locally generated framing signal is said framing signal.

17. The method of claim 15 wherein said predetermined portion comprises clock burst information and said step of determining comprises integrating said predetermined section of the scrambled intelligence signal.

18. In a receiver for receiving an intelligence signal which includes a timing signal and a transmitted key, the intelligence signal being scrambled in accordance with the transmitted key and being of such a character that proper framing is necessary for reception, an apparatus for detecting the loss of proper framing, said apparatus comprising:

receiving means for receiving the scrambled intelligence signal;

identifying means for identifying a predetermined section of the scrambled intelligence signal by reference to the transmitted key;

determining means for determining whether said predetermined section contains a predetermined portion of a horizontal blanking interval; and generating means for generating a framing loss signal if said predetermined section is found not to contain said predetermined portion.

19. The apparatus of claim 18 wherein said predetermined portion comprises clock burst information.

20. The apparatus of claim 19 wherein said determining means integrates said predetermined section of said scrambled intelligence signal.

* * * * *